United States Patent
Lee et al.

(10) Patent No.: US 11,526,064 B2
(45) Date of Patent: Dec. 13, 2022

(54) LIQUID LENS AND CAMERA MODULE INCLUDING THE SAME

(71) Applicant: LG INNOTEK CO., LTD., Seoul (KR)

(72) Inventors: Ba Ro Lee, Seoul (KR); Jae Wook Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 637 days.

(21) Appl. No.: 16/486,333

(22) PCT Filed: Feb. 14, 2018

(86) PCT No.: PCT/KR2018/001933
§ 371 (c)(1),
(2) Date: Aug. 15, 2019

(87) PCT Pub. No.: WO2018/151527
PCT Pub. Date: Aug. 23, 2018

(65) Prior Publication Data
US 2019/0384137 A1    Dec. 19, 2019

(30) Foreign Application Priority Data
Feb. 16, 2017  (KR) .................. 10-2017-0020977

(51) Int. Cl.
*G02F 1/29*    (2006.01)
*H04N 5/225*   (2006.01)

(52) U.S. Cl.
CPC ............. *G02F 1/29* (2013.01); *H04N 5/2253* (2013.01); *H04N 5/2254* (2013.01); *G02F 1/294* (2021.01)

(58) Field of Classification Search
CPC .......... G02F 1/29; G02F 1/294; H04N 5/2253; H04N 5/2254
USPC ......................................... 359/315, 665, 666
See application file for complete search history.

(56) References Cited

U.S. PATENT DOCUMENTS

| | | |
|---|---|---|
| 2006/0126190 A1 | 6/2006 | Berge et al. |
| 2007/0040146 A1 | 2/2007 | Bae et al. |
| 2008/0285143 A1 | 11/2008 | Batchko et al. |
| 2009/0021842 A1 | 1/2009 | Berge et al. |
| 2009/0303606 A1 | 12/2009 | Jiang et al. |
| 2010/0020285 A1 | 1/2010 | Berge |
| 2012/0026596 A1 | 2/2012 | Berge et al. |

(Continued)

FOREIGN PATENT DOCUMENTS

| | | |
|---|---|---|
| CN | 1782746 A | 6/2006 |
| CN | 101083723 A | 10/2007 |
| CN | 101213477 A | 7/2008 |

(Continued)

*Primary Examiner* — William Choi
(74) *Attorney, Agent, or Firm* — Birch, Stewart, Kolasch & Birch, LLP

(57) ABSTRACT

An embodiment provides a liquid lens including a first plate comprising a cavity formed therein to accommodate a first liquid, which is non-conductive, and a second liquid, which is conductive, therein, the first plate being conductive, an electrode disposed on the first plate, a second plate disposed on the electrode, the second plate being non-conductive, a third plate disposed under the first plate, and an insulation layer disposed between the first plate and the electrode and between the second liquid and the first plate.

18 Claims, 5 Drawing Sheets

(56) References Cited

U.S. PATENT DOCUMENTS

2012/0113525 A1    5/2012   Kong et al.
2016/0187642 A1    6/2016   Karam et al.

FOREIGN PATENT DOCUMENTS

| | | | |
|---|---|---|---|
| CN | 101678758 A | 3/2010 | |
| CN | 101842722 A | 9/2010 | |
| CN | 102012613 A | 4/2011 | |
| CN | 102096266 A | 6/2011 | |
| EP | 1906213 A1 * | 4/2008 | ........... G02B 26/004 |
| KR | 10-2007-0021807 A | 2/2007 | |
| KR | 10-2007-0095525 A | 10/2007 | |
| KR | 10-2007-0118847 A | 12/2007 | |
| KR | 10-2008-0037871 A | 5/2008 | |
| KR | 10-2010-0109729 A | 10/2010 | |
| KR | 10-2012-0014408 A | 2/2012 | |
| WO | WO 2007/058451 A1 | 5/2007 | |
| WO | WO 2008/015164 A1 | 2/2008 | |

* cited by examiner

[FIG. 1]
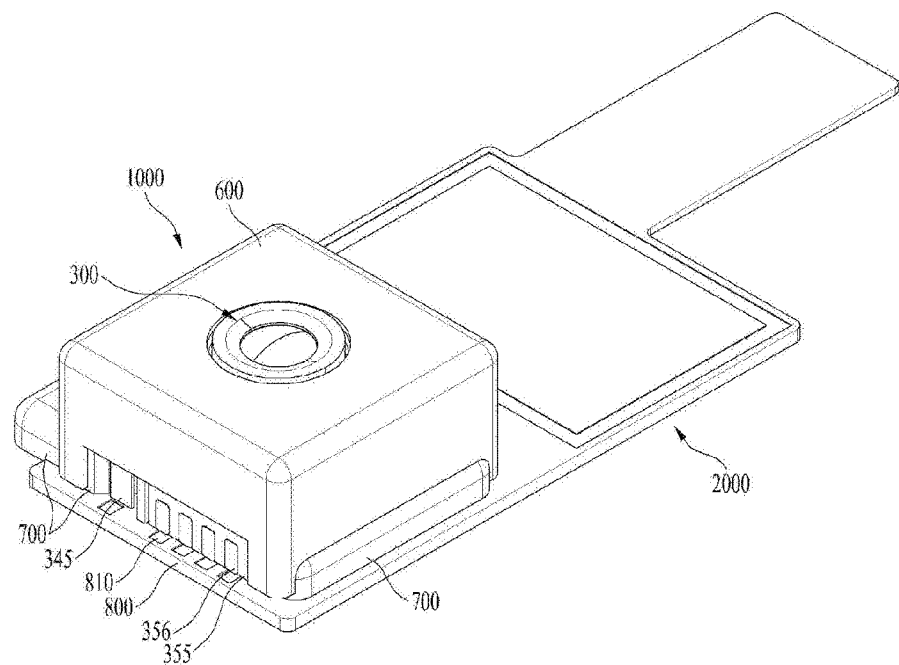

[FIG. 2]
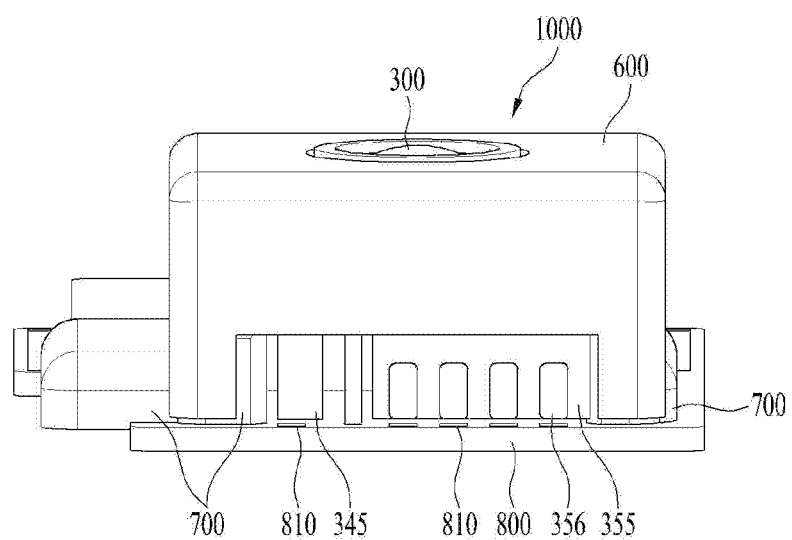

【FIG. 3a】
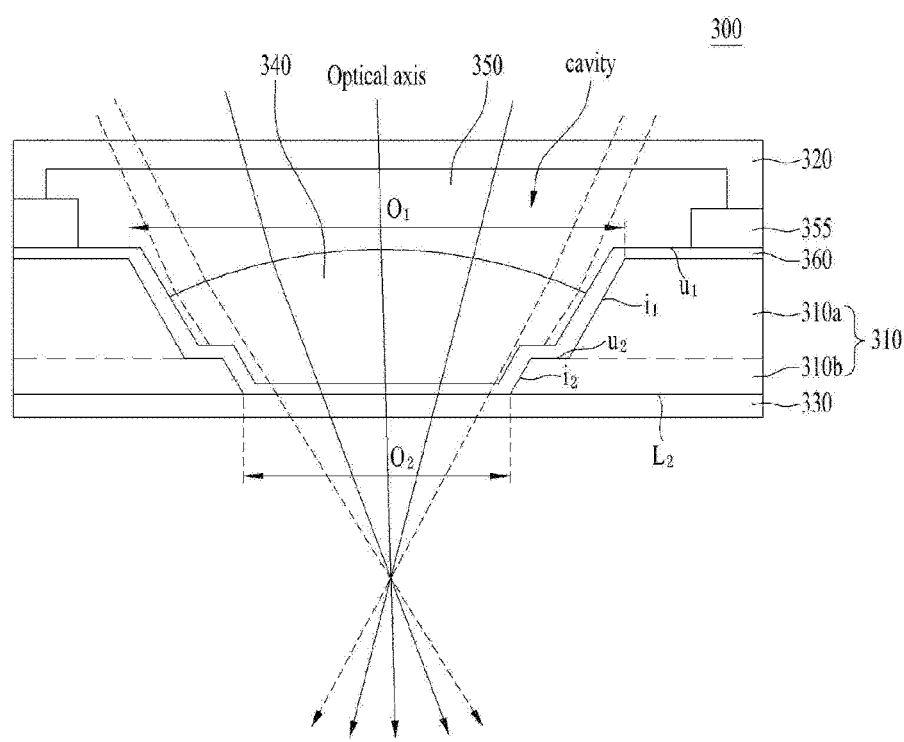

[FIG. 3b]
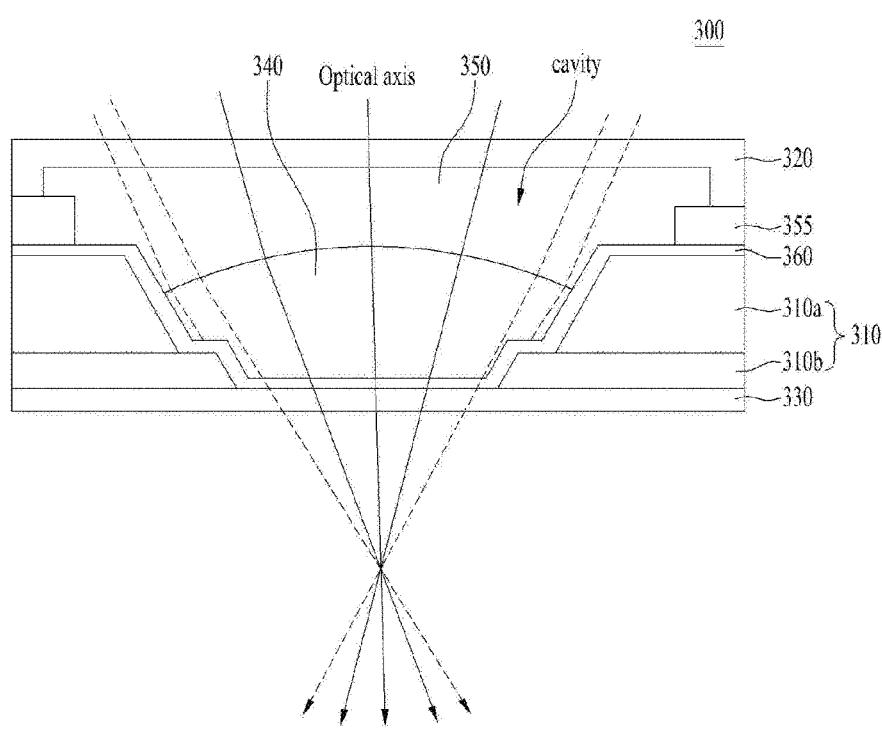

[FIG. 4]
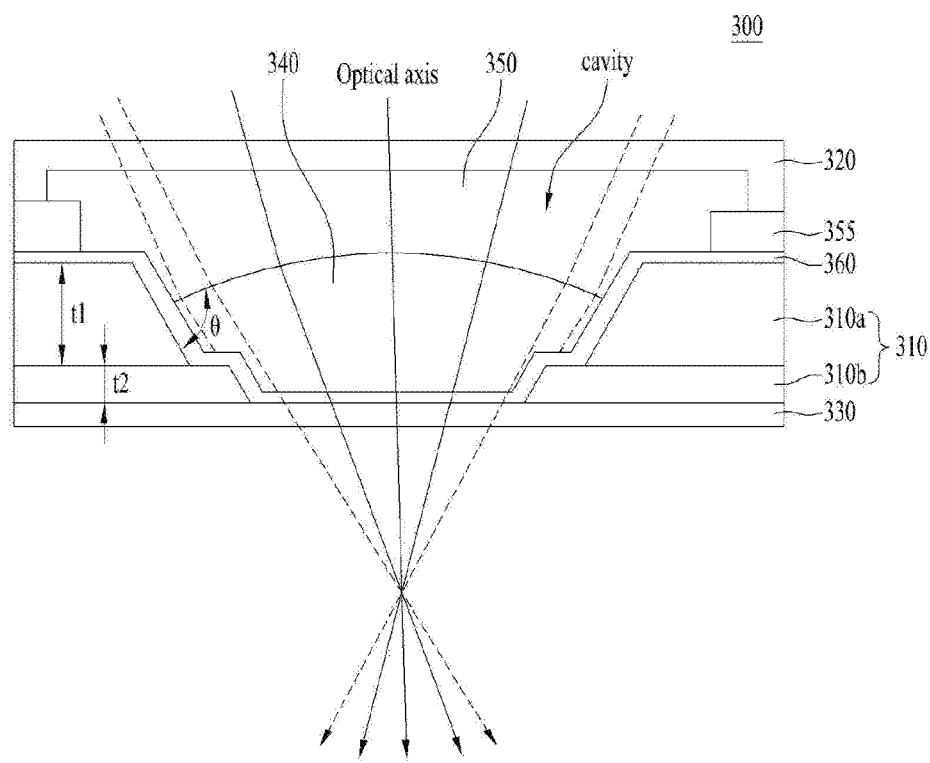

LIQUID LENS AND CAMERA MODULE INCLUDING THE SAME

CROSS REFERENCE TO RELATED APPLICATIONS

This application is the National Phase of PCT International Application No. PCT/KR2018/001933, filed on Feb. 14, 2018, which claims priority under 35 U.S.C. 119(a) to Patent Application No. 10-2017-0020977, filed in the Republic of Korea on Feb. 16, 2017, all of which are hereby expressly incorporated by reference into the present application.

TECHNICAL FIELD

Embodiments relate to a camera module, and more particularly to a camera module including a liquid lens and an optical device.

BACKGROUND ART

People who use portable devices demand optical devices that have high resolution, are small, and have various photographing functions, e.g. an autofocus (AF) function or a hand-tremor compensation or optical image stabilization (OIS) function. Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, requires driving members, such as magnets and coils, to move the lens module, and requires extra space corresponding to the moving range of the lens module in order to move the lens module, thus leading to an increase in the overall thickness of a camera module and an optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a camera module capable of performing AF or OIS functions using a liquid lens and an optical device.

Technical Solution

In one embodiment, a liquid lens may include a first plate including a cavity formed therein to accommodate a first liquid, which is non-conductive, and a second liquid, which is conductive, therein, the first plate being conductive, an electrode disposed on the first plate, a second plate disposed on the electrode, the second plate being non-conductive, a third plate disposed under the first plate, and an insulation layer disposed between the first plate and the electrode and between the second liquid and the first plate.

The inner side surface of the first plate may have at least one stepped structure.

The first plate may include an upper plate and a lower plate disposed under the upper plate, and the circumferential length of the inner side surface of the upper plate may be greater than the circumferential length of the inner side surface of the lower plate.

The inner side surface of the upper plate and the inner side surface of the lower plate may have the same inclination.

The insulation layer may be disposed so as to extend to the upper surface of the upper plate.

The thickness of the upper plate may be 3 to 7 times the thickness of the lower plate.

The first plate may be made of metal having a thermal conductivity of 200 W/mK or more.

In another embodiment, a camera module may include a holder, a liquid lens disposed on the holder, a first lens unit disposed under the liquid lens, a connection board electrically connected to the liquid lens, and a sensor board disposed under the first lens unit in the optical-axis direction of the liquid lens, the sensor board being electrically connected to the connection board and including an image sensor. The liquid lens may include a first plate including a cavity formed therein to accommodate a first liquid, which is non-conductive, and a second liquid, which is conductive, therein, the first plate being conductive, an electrode disposed on the first plate, a second plate disposed on the electrode, the second plate being non-conductive, a third plate disposed under the first plate, and an insulation layer disposed between the first plate and the electrode and between the second liquid and the first plate. The connection board may be electrically connected to the first plate and the electrode.

Advantageous Effects

A liquid lens according to the embodiment may prevent distortion or flare of an image by blocking the light incident on the edge of a cavity due to the stepped structure described above.

DESCRIPTION OF DRAWINGS

FIG. 1 is a perspective view of one embodiment of a camera module,

FIG. 2 is a side view of the embodiment of the camera module,

FIGS. 3a and 3b are views illustrating a liquid lens disposed inside the camera module, and FIG. 4 is a detailed view illustrating the structure of the liquid lens shown in FIG. 3b.

BEST MODE

Hereinafter, embodiments for accomplishing the aforementioned object will be described with reference to the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

Changing the surface tension of liquid using electricity is called "electrowetting". When voltage is applied, liquid is attracted to a metal plate and becomes flat, whereby the wetting area is increased. A liquid lens using an electrowetting phenomenon may reduce the size of a camera module compared to a configuration in which a focal length is adjusted by moving a lens, and may consume a small amount of power compared to a configuration in which a lens is mechanically moved using a motor or the like.

FIG. 1 is a perspective view of one embodiment of a camera module, and FIG. 2 is a side view of the embodiment of the camera module.

The camera module may include a lens assembly 1000 and a control circuit 2000. The camera module may include a lens assembly 1000, which includes a plurality of lenses including a liquid lens unit, the focal length of which is adjusted according to a driving voltage applied between a common terminal and a plurality of individual terminals, and a control circuit 2000 for supplying a driving voltage to the liquid lens.

The configuration of the control circuit 2000 may be designed differently in accordance with the specifications required for a photography device. In particular, in order to reduce the magnitude of the operating voltage that is applied to the lens assembly 1000, the control circuit 2000 may be implemented as a single chip. As a result, it is possible to further reduce the size of the camera module that is mounted in a portable device.

In the lens assembly 1000, a holder (not shown) may be disposed on a sensor board 800, and a first lens unit (not shown) and a liquid lens 300 may be disposed inside the holder. Further, a base may be disposed between the holder and the sensor board 800. The liquid lens 300 may be exposed through an opening formed in the front surface of the holder.

A cover 600 may be disposed so as to surround the upper surface and the side surfaces of a structure in which the base 700, the holder, the first lens unit, and the liquid lens 300 are assembled together. The cover 600 may include an opening formed in the front surface thereof. The opening formed in the front surface of the cover 600 may be disposed so as to correspond to an opening formed in the front surface of the holder.

The illustrated structure of the lens assembly 1000 is just one example, and the structure of the lens assembly 1000 may be changed depending on the specifications required for the camera module.

The liquid lens 300 may be disposed at the front side of the lens assembly 1000, and may receive light incident thereon from outside the lens assembly 1000.

An exposure lens (not shown) may be provided on the front surface of the liquid lens 300, and a cover glass may be disposed in front of the exposure lens. The exposure lens may protrude so as to be exposed to the outside of the cover, and thus the surface thereof may be damaged.

If the surface of the lens is damaged, the quality of an image captured by the camera module may be deteriorated. In order to prevent or suppress damage to the surface of the exposure lens, a method of disposing a cover glass, a method of forming a coating layer, or a method of forming the exposure lens using a wear-resistant material for preventing damage to the surface of the exposure lens may be applied.

The holder may include a through-hole formed therein in a direction parallel to the optical axis of the liquid lens 300. The liquid lens 300 and the first lens unit may be disposed in the through-hole.

The first lens unit may include a plurality of plastic or glass lenses. Further, a second lens unit, which includes a plurality of plastic or glass lenses, may be disposed on the lower surface of the first lens unit.

The liquid lens 300 and a plurality of lenses, including the first lens unit and the second lens unit, may be aligned along a center axis to form an optical system. Here, the center axis may be the same as the optical axis of the optical system.

The cover and the structures provided inside the cover may be disposed on the base 700. The base 700 may be integrally formed with the holder, or may be omitted.

The sensor board 800 including a light-receiving element (not shown) may be disposed under the first lens unit, and the light-receiving element may be, for example, an image sensor. The width and/or the length of a unit pixel of the image sensor may be, for example, 2 μm (micrometers) or less.

As illustrated, the cover 600 may include an open region, which is formed by removing a portion of one side surface of the cover 600, and a first board 345 and a second board 355 may extend so as to be exposed to the outside through the open region.

The second board 355 may extend from the liquid lens 300, and may be a flexible printed circuit board (FPCB). A plurality of terminals 356 of the second board 355 may be electrically connected to a plurality of terminals 810 of the sensor board 800.

An upper terminal of the first board 345 may be electrically connected to an electrode disposed on a first plate of the liquid lens 300, and a lower terminal (not shown) of the first board 345 may be electrically connected to the terminals 810 of the sensor board 800.

When the first and second boards 345 and 355 are provided together in an open portion formed in one side surface of the cover 600 in the lens assembly 1000, the regions thereof that contact the terminals 810 of the circuit board 800 may be disposed adjacent to each other.

FIGS. 3a and 3b are views illustrating the liquid lens disposed inside the camera module.

The liquid lens 300 may include liquids, a first plate 310, and an electrode 355. The liquids may include a first liquid 340, which is non-conductive, and a second liquid 350, which is conductive. The first plate 310 may include a cavity in which the liquids are disposed. The first plate 310 may be made of a conductive material, and may act as a first electrode. The electrode 355 may be disposed on the first plate 310, and may be referred to as a second electrode. A second plate 320 or a third plate 330 may be disposed on or under the first plate 310. At least one of the second plate 320 or the third plate 330 may be omitted.

The first plate 310 may be disposed between the second plate 320 and the third plate 330, and may include a predetermined inclined surface (e.g. an inclined surface having an angle of about 55 to 65 degrees or an angle of 50 to 70 degrees) and upper and lower openings. The region surrounded by the aforementioned inclined surface, the first opening contacting the second plate 320, and the second opening contacting the third plate 330 may be defined as a 'cavity'.

In the embodiment, the size $O_1$ of the first opening may be larger than the size $O_2$ of the second opening.

Here, the size of the opening may refer to the cross-sectional area thereof in a horizontal direction. When the opening has a circular cross-section, the size of the opening may refer to a radius, and when the opening has a square cross-section, the size of the opening may refer to a diagonal length.

The first plate 310 is a structure that accommodates the first and second liquids 340 and 350 therein. Each of the second plate 320 and the third plate 330 may include a region through which light passes, and thus may be made of a light-transmitting material such as, for example, glass. The second plate 320 and the third plate 330 may be made of the same material for convenience of processing.

The first plate 310 may be made of a transparent material, or may include impurities so that light does not easily pass therethrough. The first plate 310 may be made of a conductive material such as, for example, metal, specifically chrome (Cr). When the first plate 310 is made of a conductive material, the first plate 310 may act as a second substrate for supplying voltage to the second liquid 340. Further, the first plate 310 may be made of metal having a thermal conductivity of 200 W/mK or more, and may have excellent heat dissipation efficiency compared to a glass-based material having a thermal conductivity of about 1.4 W/mK.

The second plate 320 is a structure through which light incident thereon from the outside travels to the interior of the cavity, and the third plate 330 is a structure through which the light that has passed through the cavity travels to the first lens unit disposed thereunder.

The cavity may be filled with the first liquid 340 and the second liquid 350, which have different properties from each other, and an interface may be formed between the first liquid 340 and the second liquid 350. The curvature and the inclination of the interface formed between the first liquid 340 and the second liquid 350 may be changed.

The first liquid 340 may be oil, e.g. phenyl-based silicon oil.

The second liquid 350 may be made of, for example, a mixture of ethylene glycol and sodium bromide (NaBr).

Each of the first liquid 340 and the second liquid 350 may include at least one of a sterilizing agent or an antioxidant. The antioxidant may be a phenyl-based antioxidant or a phosphorus (P)-based antioxidant. The sterilizing agent may be any one of an alcohol-based sterilizing agent, an aldehyde-based sterilizing agent, and a phenol-based sterilizing agent.

The electrode 355 may be disposed between the first plate 310 and the second plate 320, and may act as a second board.

A portion of the second liquid 350 and a portion of the electrode 355 may be in direct contact with each other. The first plate 310 and the electrode 355 may apply an electrical signal received from an external circuit board in order to control the interface between the first liquid 340 and the second liquid 350.

The electrode 355 may be made of a conductive material, e.g. metal, and specifically may include chrome (Cr). Chromium or chrome is a glossy silver rigid transition metal, which is not fragile, does not readily discolor, and has a high melting point.

Further, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid charged in the cavity.

The inner side surface of the first plate 310 may form the side wall of the cavity. The inner side surface of the first plate 310 may have a stepped structure. In the stepped structure illustrated in the drawings, an upper portion of the first plate 310 may be referred to as a first portion 310a, and a lower portion of the first plate 310 may be referred to as a second portion 310b.

As illustrated, the width of the cavity at the first portion 310a may be larger than the width of the cavity at the second portion 310b.

The inner side surface of the first portion 310a and the inner side surface of the second portion 310b may form the side wall of the cavity. The inclination of the inner side surface $i_1$ of the first portion 310a and the inclination of the inner side surface $i_2$ of the second portion 310b may be the same as each other.

Due to the stepped structure, a portion of the upper surface u2 of the second portion 310b may be disposed between the first portion 310a and the second portion 310b. The upper surface u2 of the second portion 310b may be parallel to the upper surface u1 of the first portion 310a and the lower surface L2 of the second portion 310b. Here, "being parallel" does not mean being completely geometrically parallel.

The insulation layer 360 may be disposed on the inner side wall of the cavity, between the upper surface of the first plate 310 and the electrode 355, and on the bottom surface of the cavity. The insulation layer 360 may be disposed between the first liquid 340 and the third plate 330 on the bottom surface of the cavity.

The insulation layer 360 may be implemented as, for example, a parylene C coating agent, and may further include a white dye. The white dye may increase the degree to which light is reflected by the insulation layer 360 forming the inner side wall of the cavity.

Since the thickness of the insulation layer 360 is thin, on the order of several micrometers, the insulation layer 360 may be disregarded when the angle between the first plate 310 and the interface is determined, which will be described later.

Each of the second plate 320 and the third plate 330 may have rectangular edges. However, the disclosure is not limited thereto.

The second board 355 may be exposed from at least one region of the edges of the second plate 320, and may be integrated with a flexible printed circuit board so as to be electrically connected to the aforementioned sensor board.

Referring to FIG. 3a, among the light traveling from the second plate 320 toward the third plate 330, a light component incident on the edge of the cavity may be blocked by the upper surface u2 of the second portion 310b, and may not travel downwards.

The aforementioned light incident on the edge of the cavity may travel after being partially reflected by the side wall of the cavity. Therefore, when the light travels to the lower side of the third plate 330, distortion or flare of an image may occur. The liquid lens according to the embodiment may prevent distortion or flare of an image by blocking the light incident on the edge of the cavity due to the stepped structure described above.

The structure of the liquid lens 300 shown in FIG. 3b is the same as that in FIG. 3a except that the first portion 310a and the second portion 310b of the first plate 310 are disposed separately from each other. The first portion 310a and the second portion 310b shown in FIG. 3a are distinguished from each other in terms of the geometric shapes thereof, whereas the first portion 310a and the second portion 310b shown in FIG. 3b may be made of the same material, or may be made of different materials, and an interface may be formed at the coupling region therebetween when they are coupled to each other.

In FIGS. 3a and 3b, the cavity having a side wall defined by the first portion 310a, which is located at the upper position, may be referred to as a first cavity, and the cavity having a side wall defined by the second portion 310b, which is located at the lower position, may be referred to as a second cavity. The first and second cavities may be combined to form one cavity.

FIG. 4 is a detailed view illustrating the structure of the liquid lens shown in FIG. 3b, and this structure may also be applied to the liquid lens shown in FIG. 3a.

The thickness t of the first portion 310a forming the first plate 310 may be 3 to 7 times, e.g. 5 times, the thickness t2 of the second portion 310b.

The edge of the interface between the first liquid 340 and the second liquid 350 is in contact with the inner side surface of the first plate 310, specifically the inner side surface of the first portion 310a. The angle θ between the interface and the inner side surface of the first plate 310 may range from 19.2 degrees to 97.5 degrees.

Further, the voltage applied to the first liquid 340 and the second liquid 350 may range from 24.4 volts to 70 volts.

The side wall of the cavity may form an angle of about 60 degrees with respect to the horizontal plane in FIG. 3a. At this time, the angle θ formed by the interface between the first liquid 340 and the second liquid 350 may range from 19.2 degrees (°) to 97.5 degrees. When the aforementioned angle is larger than 97.5 degrees, the aforementioned interface may come into contact with the second plate 320, and when the angle is smaller than 19.2 degrees, the interface may become excessively concave downwards and may come into contact with the third plate 330.

In order to allow the interface to move within the aforementioned angular range, the ratio of the thickness of the first portion 310a to the thickness of the second portion 310b may be about 5:1. When the thickness t2 of the second portion 310b is greater than ⅕ or ⅓ of the thickness t1 of the first portion 310a, the range within which the interface is movable may be reduced, and the aforementioned angular range may also be reduced.

The camera module including the above-described liquid lens may be mounted in various digital devices, such as a digital camera, a smartphone, a laptop computer, and a tablet PC. In particular, the camera module may be mounted in mobile devices to realize an ultra-thin high-performance zoom lens.

For example, a digital device, in which the camera module, including the liquid lens, the first and second lens units, the filter, and the light-receiving element, converts an image incident from the outside into an electrical signal, may include a display module including a plurality of pixels, the colors of which are changed by the electrical signal. The display module and the camera module may be controlled by a control unit.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

A liquid lens module and a camera module including the same according to the embodiments may be used in mobile devices.

The invention claimed is:

1. A liquid lens, comprising:
a first plate comprising a cavity formed therein to accommodate a first liquid, which is non-conductive, and a second liquid, which is conductive, therein, the first plate being conductive;
an electrode disposed on the first plate;
a second plate disposed on the electrode, the second plate being non-conductive;
a third plate disposed under the first plate; and
an insulation layer disposed between the first plate and the electrode and between the second liquid and the first plate,
wherein the first plate includes:
an upper plate having an inclined surface; and
a lower plate disposed under the upper plate, the lower plate having an inclined surface,
wherein the upper plate and the lower plate define a stepped structure between the inclined surface of the first plate and the inclined surface of the second plate, and
wherein an edge of an interface between the first liquid and the second liquid contacts the inclined surface of the upper plate.

2. The liquid lens according to claim 1, wherein a circumferential length of the inclined surface of the upper plate is greater than a circumferential length of the inclined surface of the lower plate.

3. The liquid lens according to claim 2, wherein the inclined surface of the upper plate and the inclined surface of the lower plate have a same inclination.

4. The liquid lens according to claim 2, wherein the insulation layer is disposed so as to extend to an upper surface of the upper plate.

5. The liquid lens according to claim 2, wherein a thickness of the upper plate is 3 to 7 times a thickness of the lower plate.

6. The liquid lens according to claim 2, wherein an upper surface of the upper plate, an upper surface of the lower plate, and a lower surface of the lower plate are parallel to one another.

7. The liquid lens according to claim 2, wherein the lower plate protrudes to an optical-axis of the liquid lens, and
wherein, among the light traveling from the second plate toward the third plate, a light incident on an edge of the cavity is blocked by an upper surface of the protruding lower plate.

8. The liquid lens according to claim 2, wherein the upper plate is integrally formed with the lower plate.

9. The liquid lens according to claim 2, wherein the upper plate and the lower plate are disposed separately from each other.

10. The liquid lens according to claim 1, wherein the insulation layer is disposed between the first liquid and the first plate.

11. The liquid lens according to claim 1, wherein an angle between the interface and the inclined surface of the upper plate ranges from 19.2 degrees to 97.5 degrees.

12. The liquid lens according to claim 11, wherein a thickness of the upper plate is 5 times a thickness of the lower plate.

13. A liquid lens, comprising:
a first plate comprising a cavity formed therein to accommodate a first liquid, which is non-conductive, and a second liquid, which is conductive, therein, the first plate being conductive;
an electrode disposed on the first plate;

a second plate disposed on the electrode, the second plate being non-conductive;
a third plate disposed under the first plate; and
an insulation layer disposed between the first plate and the electrode and between the second liquid and the first plate,
wherein the first plate is made of metal having a thermal conductivity of 200 W/mK or more.

14. A camera module, comprising:
a holder;
a liquid lens disposed on the holder;
a first lens unit disposed under the liquid lens;
a connection board electrically connected to the liquid lens; and
a sensor board disposed under the first lens unit in an optical-axis direction of the liquid lens, the sensor board being configured to be electrically connected to the connection board, the sensor board comprising an image sensor,
wherein the liquid lens comprises:
a first plate comprising a cavity formed therein to accommodate a first liquid, which is non-conductive, and a second liquid, which is conductive, therein, the first plate being conductive;
an electrode disposed on the first plate;
a second plate disposed on the electrode, the second plate being non-conductive;
a third plate disposed under the first plate; and
an insulation layer disposed between the first plate and the electrode and between the second liquid and the first plate,
wherein the connection board is configured to be electrically connected to the first plate and the electrode,
wherein the first plate includes:
an upper plate having an inclined surface; and
a lower plate disposed under the upper plate, the lower plate having an inclined surface,
wherein the upper plate and the lower plate define a stepped structure between the inclined surface of the first plate and the inclined surface of the second plate, and
wherein an edge of an interface between the first liquid and the second liquid contacts the inclined surface of the upper plate.

15. The camera module according to claim 14, wherein a circumferential length of the inclined surface of the upper plate is greater than a circumferential length of the inclined surface of the lower plate.

16. The camera module according to claim 15, wherein the inclined surface of the upper plate and the inclined surface of the lower plate have a same inclination, and
wherein the insulation layer is disposed so as to extend to an upper surface of the upper plate.

17. The camera module according to claim 15, wherein the lower plate protrudes to an optical-axis of the liquid lens, and
wherein, among the light traveling from the second plate toward the third plate, a light incident on an edge of the cavity is blocked by an upper surface of the protruding lower plate.

18. The camera module according to claim 14, wherein the insulation layer is disposed between the first liquid and the first plate.

* * * * *